(12) United States Patent
Burks

(10) Patent No.: US 8,905,667 B1
(45) Date of Patent: Dec. 9, 2014

(54) SCENT DISPENSER FOR ATTACHMENT TO A HUNTER'S BOOT

(71) Applicant: Kym Burks, Livingston, TX (US)

(72) Inventor: Kym Burks, Livingston, TX (US)

(*) Notice: Subject to any disclaimer, the term of this patent is extended or adjusted under 35 U.S.C. 154(b) by 0 days.

(21) Appl. No.: 14/034,536

(22) Filed: Sep. 23, 2013

Related U.S. Application Data

(60) Provisional application No. 60/704,341, filed on Aug. 1, 2005.

(51) Int. Cl.
   *B43M 11/06* (2006.01)
   *A01M 31/00* (2006.01)
   *A45F 3/16* (2006.01)

(52) U.S. Cl.
   CPC ..................................... *A01M 31/00* (2013.01)
   USPC .............. 401/205; 401/195; 43/1; 224/148.1; 224/148.4; 224/148.6; 222/175; 222/613; 248/311.3

(58) Field of Classification Search
   USPC ......... 401/196, 195, 205, 207; 43/1; 222/175, 222/179, 608, 610, 613, 614; 224/148.1, 224/148.4, 148.6, 148.7, 191, 222; 239/152, 153; 248/311.2, 311.3
   See application file for complete search history.

(56) References Cited

U.S. PATENT DOCUMENTS

| | | | |
|---|---|---|---|
| 4,682,715 A | 7/1987 | Reeves | |
| 4,735,010 A | 4/1988 | Grinarml | |
| 5,148,949 A | 9/1992 | Luca | |
| 5,461,814 A | 10/1995 | Reid et al. | |
| D386,256 S | * 11/1997 | Turpin | ......................... D23/368 |
| 5,819,997 A | * 10/1998 | Mathis et al. | .............. 224/148.4 |
| 6,038,804 A | 3/2000 | Cuerrier | |
| 7,533,832 B2 | * 5/2009 | Price et al. | ..................... 239/154 |
| 7,690,540 B1 | 4/2010 | Owens | |
| 8,151,492 B2 | * 4/2012 | Rackiewicz et al. | ............ 36/136 |
| 2006/0169793 A1 | 8/2006 | Price et al. | |
| 2006/0289668 A1 | 12/2006 | Szymczak et al. | |
| 2009/0050711 A1 | * 2/2009 | Castner | ......................... 239/152 |

* cited by examiner

*Primary Examiner* — David Walczak
(74) *Attorney, Agent, or Firm* — Kenneth A. Roddy

(57) ABSTRACT

A scent dispenser includes a holder member that is removably attached to the back side and heel of a hunter's boot and has curved arms disposed at each side thereof, the holder attached to the boot by an elastic cord that extends from one arm, over the vamp portion of the boot, and is releasably attached to the other arm. The back side of the holder removably holds a scent containing bottle in an inverted position at the rear portion of the boot, the bottle having a cap with a sponge that extends a distance below the bottom of the boot heel to engage the ground surface and is compressed to deposit an amount of the scent onto the ground each time a step is taken to leave a scented trail to attract animals, or mask the smell of a human. The bottle may be removed and hung from another object.

7 Claims, 5 Drawing Sheets

SCENT DISPENSER FOR ATTACHMENT TO A HUNTER'S BOOT

CROSS REFERENCE TO RELATED APPLICATION

This application claims priority of U.S. Provisional Application Ser. No. 61/704,341, filed Sep. 21, 2012, the pendency of which is extended until Sep. 23, 2013 under 35 U.S.C. 119(e)(3).

BACKGROUND OF THE INVENTION

1. Field of the Invention

This invention relates generally to scent dispensing apparatus and, more particularly, to a scent dispenser and holder for attachment to a hunter's boot which, when attached, automatically dispenses an amount of an animal attractant scent or a human masking scent with each step while walking.

2. Background Art

It is well known that game animals such as deer and the like are attracted during mating season by certain scents, and are sensitive to the odor of humans. Accordingly, animal attractant scents may be dispersed within the hunting area, in a direction leading to the hunter's blind, to lure them in the direction of the hunter. Masking scents are also utilized by hunters to cover or disguise their scent trail. Various liquid scents have been formulated to produce a smell that will lure or attract an animal, will mask the smell of a human, or will both attract an animal and mask the smell of a human.

One of the most common dispensers for liquid scent is known as a "drag" or "drag rag", wherein a hunter applies a liquid scent to an absorbent pad or rag which is dragged behind him as he walks to cover a trail to his blind. The scent rubs off on the trail, but as the pad is dragged, the scent is diluted, resulting in a strong scent at the beginning of the trail and diminishing near the end. Scent dispensers that are dragged over the ground surface do not apply a consistent amount of scent, can create noise, may become tangled, and may otherwise be inconvenient to use.

There are several patents directed toward scent dispensers that may attached to a hunter's leg or boot and have various mechanisms for automatically dispensing an amount of liquid scent. The following are some examples.

Reeves, U.S. Pat. No. 4,682,715, discloses a detachable shoe-lure dispenser for dispensing lure directly onto the ground for attracting animals or camouflaging one's own scent. The dispenser consists of a container from which deer lure or other scent camouflaging liquid is gradually dispensed onto an elongated, flexible, absorbent applicator, which is drug along the ground during walking activity, thereby leaving a scented trail along one's path.

Grinarml, U.S. Pat. No. 4,735,010, discloses a scent dispenser for attachment under a shoe which comprises a flexible tubular body with apertures in the wall and a pair of plastic plugs that engage and close each end of the body. A scent absorbing sponge and a fluid for attracting animals received in the body. An elastic band extending from plug to plug is placed around the shoe to secure the device in place beneath the elevated portion of the shoe sole adjacent to the heel. The scent is then distributed in the area to be marked by wearing the footwear while walking in the area with the scent distributing device connected to the footwear.

Reid et al, U.S. Pat. No. 5,461,814, discloses a scent dispenser having a casing which is attached to the sole of a boot by means of VELCRO®. The casing flexes when compressed by the force exerted upon it by the boot upon contact with the ground and returns to its unflexed condition when the boot is raised from the ground. The casing has a cavity for scented liquid and two or more apertures which communicate the cavity with the atmosphere outside the dispenser. When the casing is compressed, scented liquid is expelled from the cavity through the apertures to the atmosphere. When the cavity is not compressed, the liquid is confined within the cavity.

Cuerrier, U.S. Pat. No. 6,038,804, discloses a scent dispenser shaped to fit under the sole of a hunter's boot. The dispenser includes a reservoir for carrying liquid scent, an inlet in the bottom for filling the reservoir, and closure means for closing the inlet. Slots are formed on the sides of the dispenser and straps mounted in each slot attach the dispenser to the boot with its top surface against the sole of the boot with the front of the boot heel located in a cutout in the top surface. Strands of material extend downward and rearwardly from the reservoir to contact the ground and distribute the scent as the hunter walks. Two ground contacting pads project downwardly from the boot defining a groove between them to protect the liquid distributing strands. Preferably, the pads form the shape of a deer's hoof with the groove between the two main toes in the hoof.

Owens, U.S. Pat. No. 7,690,540, discloses a liquid animal scent dispenser that can be strapped to the leg of a user by an elasticized strap, a strap with a buckle, or mating male and female members such as VELCRO®. The strap may also be used to hang the dispenser from a tree branch. The scent dispenser sprays droplets of liquid scent under control of a controller. In a manual mode, the controller is programmed to dispense droplets at intervals on signal of a tilt switch such that the times of spraying can be keyed to a hunter's walking rate. In an automatic mode, the controller is programmed to dispense droplets at preset intervals. LEDs are provided on the dispenser to indicate the mode in which the controller is programmed.

Price et al, U.S. Published Application 2006/0169793, discloses a leg mounted scent dispenser that distributes liquid scent to mask human scent or to deposit a tangle free and consistent scent trail. The dispenser includes straps for attaching to a boot and to the lower leg of a person. The boot level strap connects to a canister filled with a scent of the hunter's. The canister communicates with a drip valve, or alternatively a pump, that discharges a small portion of scent with each time the boot lands. The person regulates the desired scent flow and walks to a stand or tracks the game. Once at a stand or having taken the game, the hunter turns off the canister and removes the present invention for storage.

Szymczak et al, U.S. Published Application 2006/0289668, discloses a scent dispersing and storage apparatus that includes a source of animal scent within a flexible bladder. In one embodiment, the bladder is inserted within a pouch, which may be coupled to a person's leg or to an object such as a tree. A nozzle and a valve coupled to the bladder regulate flow of the scent from the bladder in a controlled manner for leaving the animal scent along a trail or creating a scent bomb.

SUMMARY OF THE INVENTION

The present invention is distinguished over the prior art in general, and these patents in particular by a scent dispenser which includes a holder member configured to be retained on the back side of a hunter's boot and has a base plate engaged on the bottom of the heel of the boot and arcuate curved arms disposed at each side thereof. The holder is releasably retained on the boot by an elastic cord secured at one end to one curved arm, stretched over the vamp portion of the boot, and its free end releasably engaged on the other curved arm. The back side of the holder member also configured to removably receive and retain a bottle containing a liquid scent that will lure or attract an animal, that will mask the smell of a human, or that will both attract an animal and mask the smell of a human. The bottle has a cap with a sponge and is retained on the back side of the holder member in a vertical inverted position with the sponge extending downward and a distance below the bottom of the boot heel to engage the ground surface when a step is taken. The sponge becomes saturated with the liquid scent when the bottle is inverted and each time the user takes a step, the sponge becomes compressed to deposit an amount of the scent onto the ground surface, thereby leaving a scented trail to lure or attract animals, or mask the smell of a human. When removed from the holder member, the bottle containing the liquid scent may be hung in an inverted position by placing a hook attached on its bottom end wall onto another article, such as a tree branch or hunting blind to lure or attract animals, or mask the smell of a human.

One of the features and advantages of the present invention is that the scent dispenser is easily and quickly attached to a hunter's boot.

Another feature and advantage of the present invention is that the scent dispenser, when attached to a hunter's boot, resides on the back side of the boot and has a base plate engaged on the bottom of the heel of the boot.

Another feature and advantage of the present invention is that the scent dispenser, when attached to a hunter's boot, automatically dispenses an amount of an animal attractant scent or a human masking scent with each step while walking.

Another feature and advantage of the present invention is that the scent dispenser, when attached to a hunter's boot, allows a hunter to easily dispense an animal attractant scent or human masking scent along a trail or within the hunting area, in a direction leading to the hunter's blind.

Another feature and advantage of the present invention is that the scent dispenser applies a consistent amount of scent along a trail, does not create noise, and does not become tangled.

A further feature and advantage of the present invention is that the scent dispenser has a scent containing bottle that can be easily and quickly removed from the holder member and hung in an inverted position from another article, such as a tree branch or hunting blind to lure or attract animals, or mask the smell of a human within the hunting area.

Still further features and advantages of the present invention is that it is simple in construction, inexpensive to manufacture, and rugged and reliable in operation.

Other features and advantages of the invention will become apparent from time to time throughout the specification and claims as hereinafter related.

DESCRIPTION OF THE PREFERRED EMBODIMENT

As used herein, the term "boot" means a sturdy item of footwear or footgear covering the foot, the ankle, and sometimes the leg below the knee of a wearer. The term "upper", used in conjunction with a boot, means the part of a boot above the sole that covers the upper surface of the foot. The term "vamp" means the portion of a boot upper that covers the instep and toes. The term "scent" means a liquid formulated to produce a smell that will lure or attract an animal, will mask the smell of a human, or will both attract an animal and mask the smell of a human.

Figure 1:
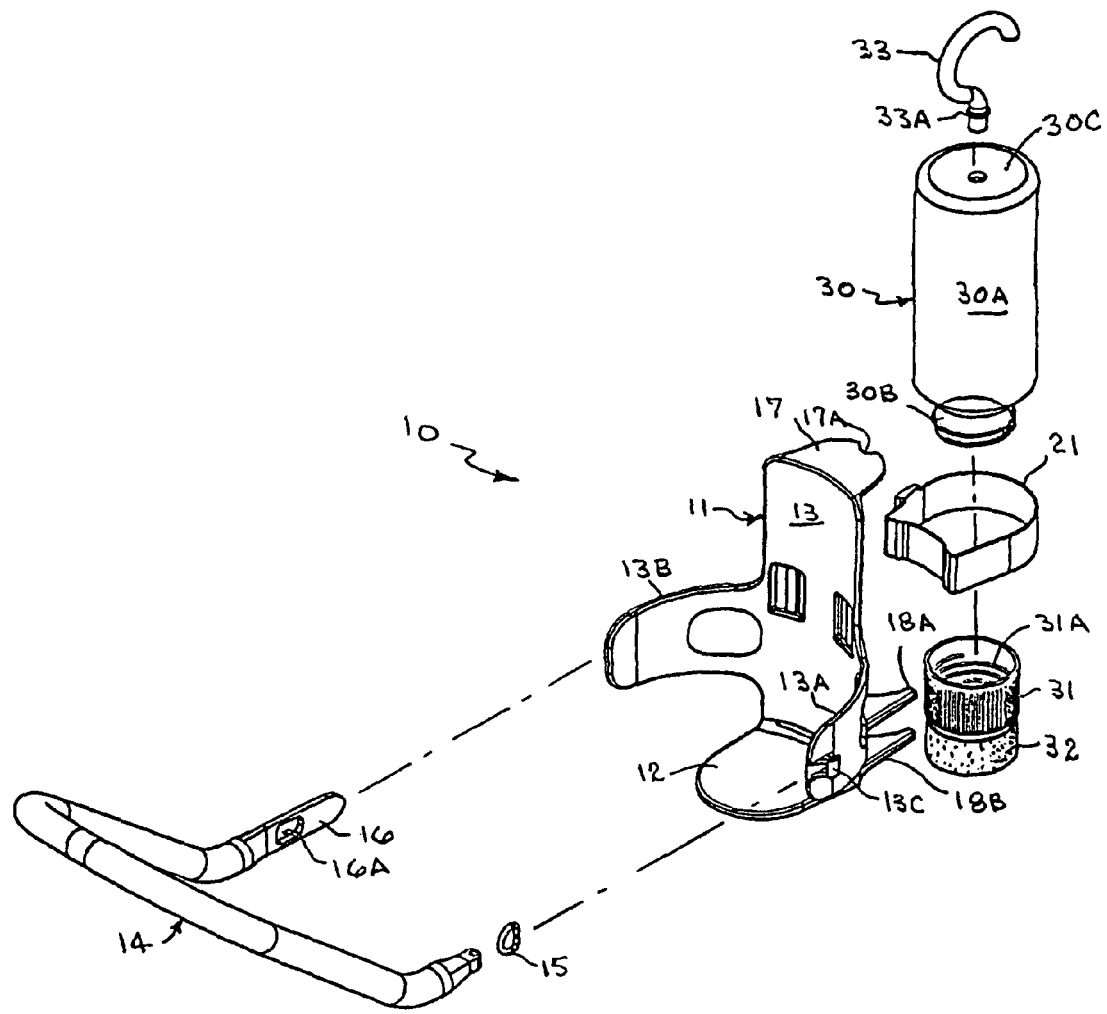
FIG. 1 is an exploded perspective view of the components of the scent dispenser in accordance with the present invention, shown in an unassembled condition.
Figure 3:
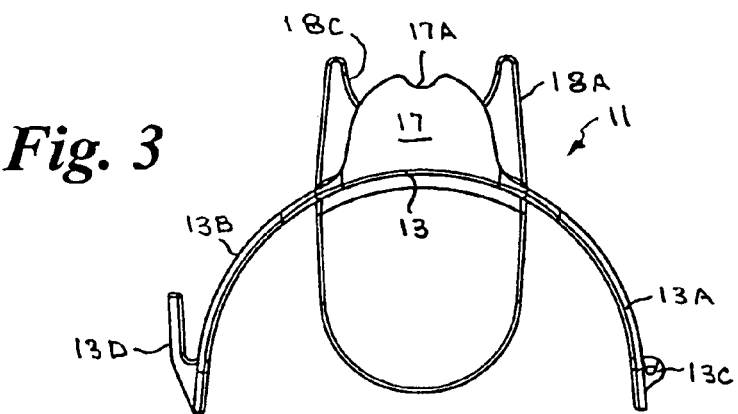
FIG. 3 is top plan view of the holder member
Figure 4:
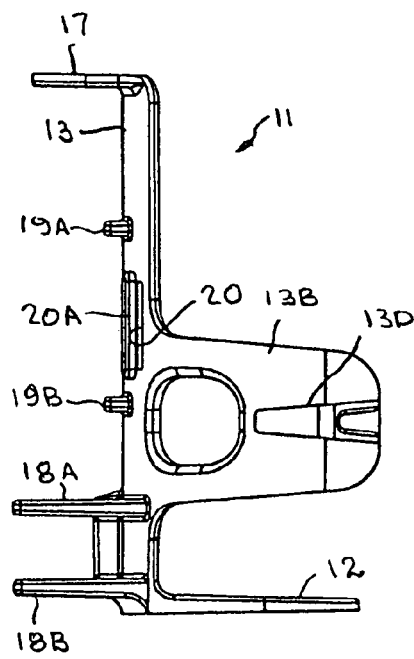
FIG. 4 is a left side view of the holder member
Figure 2:
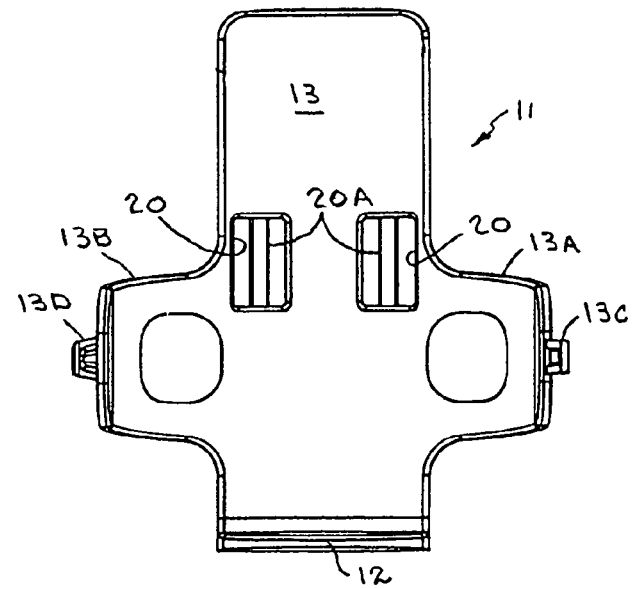
FIG. 2 is front elevation view of the holder member of the scent dispenser.
Figure 6:
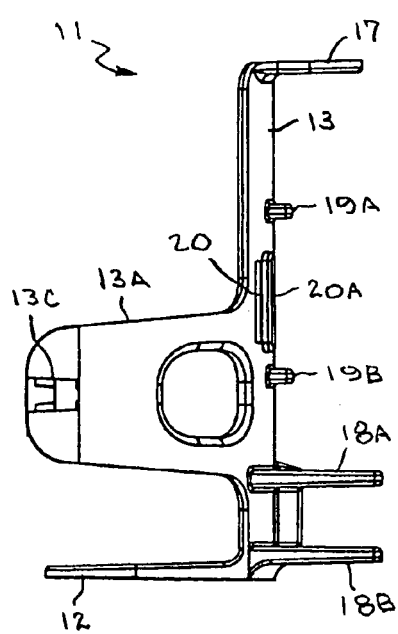
FIG. 6 is a right side view of the holder member
Figure 5:
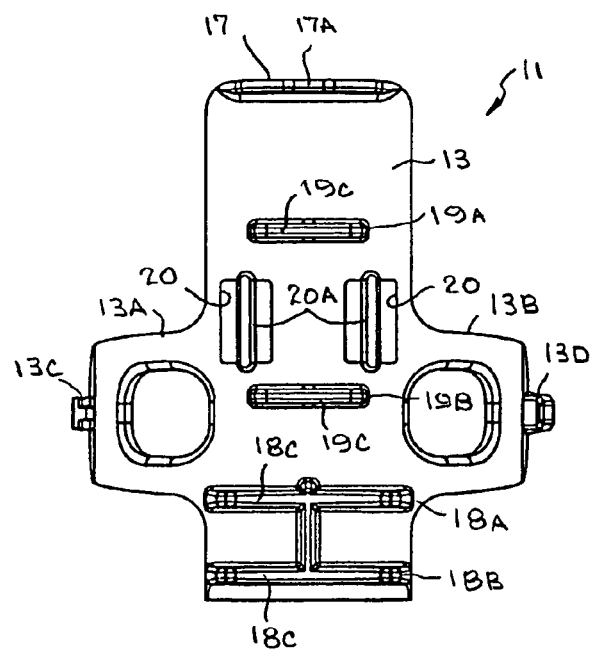
FIG. 5 is rear elevation view showing the back side of the holder member.
Figure 7:
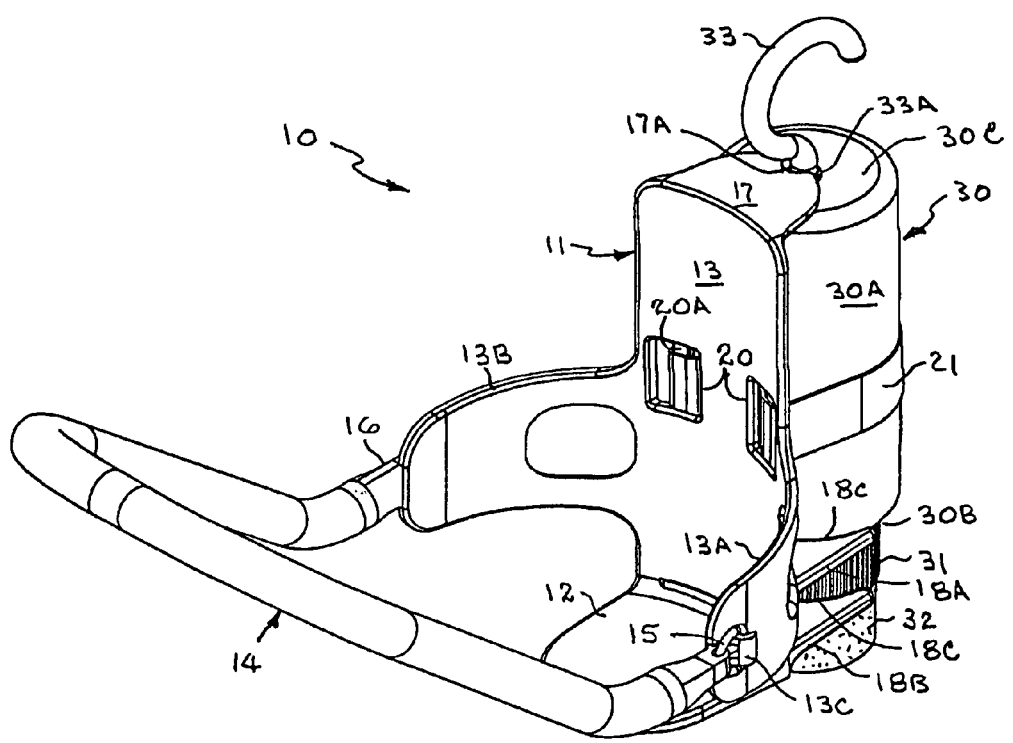
FIG. 7 is an exploded perspective view of the components of the scent dispenser shown in an assembled condition.
Figure 8:
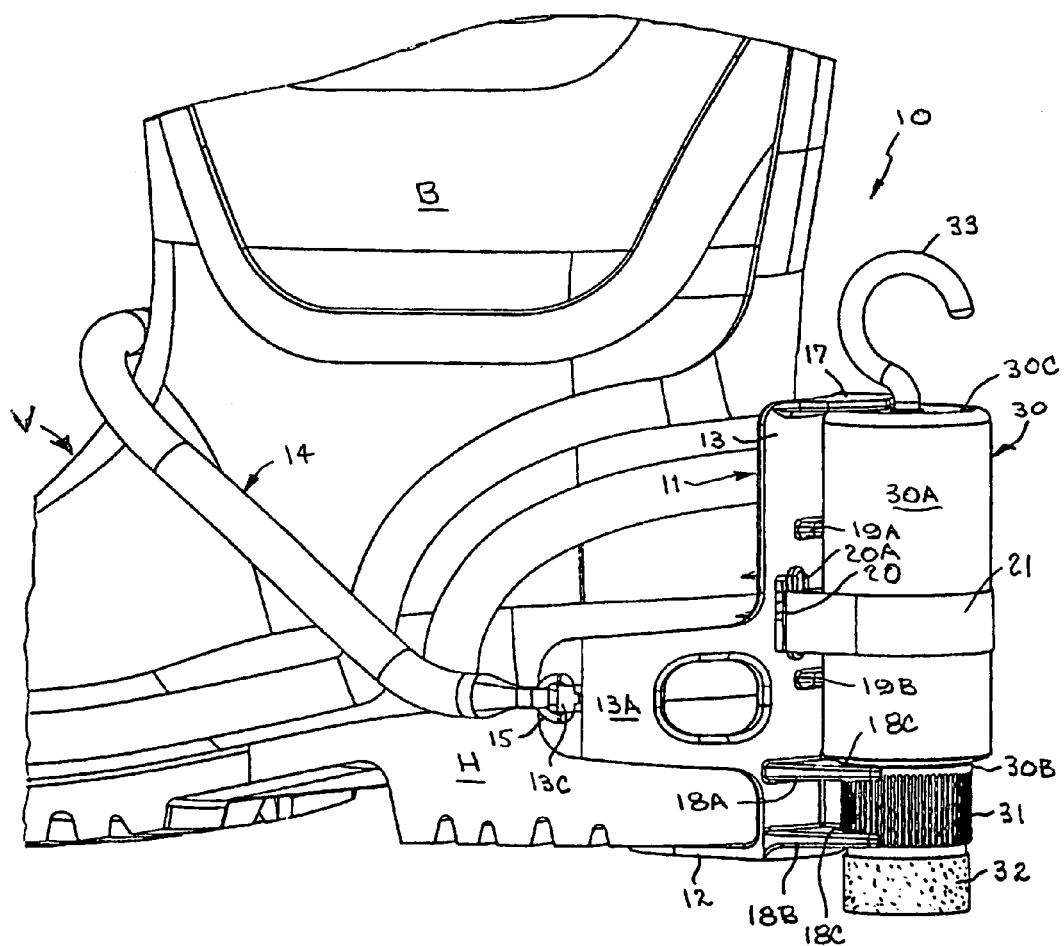
FIG. 8 is a side elevation view of the assembled scent dispenser attached at the rear of the heel portion of a hunter's boot.

Referring now FIGS. 1-8 of the drawings by numerals of reference, briefly stated, the present scent dispenser 10 includes a holder member 11 configured to removably hold a scent containing bottle 30 in an inverted position at the rear of the heel portion of a hunter's boot, the holder member being removably attached to the boot by means of an elastic cord 14 that extends over the vamp portion of the boot, as described in detail hereinafter.

The bottle 30 will be first described for ease of understanding of the components of the holder 11 that receive and hold the bottle. The bottle 30 has a cylindrical main body 30A formed of rigid or flexible material defining a liquid reservoir for containing a liquid scent and an externally threaded reduced diameter neck portion 30B. The liquid scent may be a liquid formulation that produces a smell that will lure or attract an animal, that will mask the smell of a human, or that will both attract an animal and mask the smell of a human. A removable cap 31 having mating internal threads 31A threadedly engaged on the reduced diameter neck portion 30B. The removable cap 31 is preferably of a smaller diameter than the diameter of the main body 30A of the bottle 30. A generally cylindrical sponge 32 is secured to the end wall of the cap 31 and is in fluid communication with the interior of the bottle 30. The end wall of the cap 31 may have one or more apertures therethrough over which one end of the sponge 32 is secured so as to allow the liquid contents of the bottle to saturate the sponge when the bottle is inverted. A hook 33 with a seal 33A may be secured to the bottom end wall 30C of the bottle 30 to allow it to be hung from another article, such as a tree branch or hunting blind when removed from the holder.

The holder 11 is preferably molded of a rigid material and has a generally flat horizontal base plate 12 sized and shaped to be received on the bottom of the heel H of a user's boot B and an arcuate vertical wall 13 extending upward from a back end thereof which is concavely curved about a vertical axis to accommodate the backside of the boot B when the base plate 12 is engaged on the bottom of the heel H of the boot. The outer facing end of the base plate 12 may be convexly curved.

A pair of contiguous arcuate curved arms 13A and 13B disposed a short distance above the base plate 12 extend outwardly and forwardly from the sides of the arcuate vertical wall 13 in laterally opposed relation. The outer facing ends of arms 13A and 13B may be convexly curved. A D-ring attachment member 13C is formed on one of the curved arms 13A near its outer end that is configured to receive and retain a D-ring. A rearward facing hook 13D is formed on the opposed curved arm 13B near its outer end.

An elastic cord 14 having a D-ring 15 at one end and a detachable fastener 16 at the opposed end is secured to the D-ring attachment member 13C on the arm 13A. The detachable fastener 16 may be a flat clip having a hole 16A therethrough, or a loop at the free end of the elastic cord, for attachment to the rearward facing hook 13D. The elastic cord 14 is stretched over the vamp portion V of the boot B, and the detachable fastener 16 is releasably engaged on the rearward facing hook 13D on the opposed curved arm 13B to retain the holder 11 on the boot.

A contiguous generally flat top plate 17 extends outwardly and rearwardly from the top end of the back side of the arcuate vertical wall 13. The rearward facing end of the top plate 17 may be convexly curved and provided with an inwardly curved recess 17A sized to accommodate and partially encircle the hook 33 and seal 33A at bottom end wall 30C of the inverted bottle 30 containing the liquid scent.

A generally flat upper support plate 18A and lower support plate 18B extend outwardly and rearwardly from the lower end of the back side of the arcuate vertical wall 13 in parallel vertically spaced relation. The rearward facing end of the upper and lower support plates 18A and 18B are each convexly curved and provided with an inwardly curved concave recess 18C sized to receive and partially encircle the reduced diameter neck portion 30B and cap 31 of the bottle 30 containing the liquid scent. The generally cylindrical sponge 32 secured to the end wall of the cap 31 extends downward through the recess of the lower support plate 18B to engage the ground surface.

A pair of intermediate bottle support members 19A and 19B disposed a distance below the top plate 17 extend a short distance outwardly and rearwardly from the back side of the arcuate vertical wall 13 in parallel vertically spaced relation. The outer facing ends of the intermediate bottle support members 19A and 19B are each provided with an inwardly curved concave recess 19C sized to receive and partially encircle the cylindrical body portion 30A of the bottle 30 containing the liquid scent.

A pair of laterally spaced vertical slots 20 are formed through the vertical wall 13, vertically between the intermediate bottle support members 19A and 19B, and each is provided with a vertical center post 20A.

An elastic ring 21 is secured through the laterally spaced vertical slots 20 and over the center posts 20A and extends a short distance outwardly and rearwardly from the back side of the arcuate vertical wall 13 to receive and partially encircle the cylindrical body portion 30A of the bottle containing the liquid scent to resiliently hold the bottle firmly in the curved recess 19C of the intermediate bottle support members 19A and 19B. The elastic ring 21 may be formed of an elastic strap or elastic cord having ends crimped together. Alternatively, the bottle-holding ring may be formed of a flexible strap of hook and loop fastener material having hook elements on one side and loop elements on the other side which is installed through the laterally spaced vertical slots 20 and over the center posts 20A such that its free ends extend rearwardly from the back side of the arcuate vertical wall 13 to be overlapped to attach them around the cylindrical body portion of the bottle.

It should be understood from the foregoing that the bottle 30 containing the liquid scent is inverted and placed vertically through the elastic ring 21 and horizontally into the holder member 11 in a vertical inverted position such that its bottom end wall 30C is engaged on the underside of the top plate 17 with the hook 33 extending upwardly therefrom; the reduced diameter neck portion 30B and cap 31 of the bottle is received and supported between the upper and lower support plates 18A and 18B with the cylindrical sponge 32 extends downward from the lower support plate 18B to engage the ground surface; and the body 30A of the bottle is retained in the intermediate bottle support members 19A and 19B by the elastic ring 21.

After the bottle 30 containing the liquid scent is installed on the holder member 11; the holder member is placed on back the backside of the boot B with the base plate 12 engaged on the bottom of the heel H of the boot and the arcuate curved arms 13A and 13B disposed at each side; the elastic cord 14 is stretched over the vamp portion V of the boot B; and the detachable fastener 16 at its free end is releasably engaged on the rearward facing hook 13D on the curved arm 13B to retain the holder 11 on the boot.

When the holder member 11 containing the bottle 30 is properly attached to the boot B, the cylindrical sponge 32 extends downward from the lower support plate 18B and a distance below the bottom of the heel H to engage the ground surface when a step is taken. The sponge 32 becomes saturated with the liquid scent when the bottle 30 is inverted and each time the user takes a step, the sponge becomes compressed to deposit an amount of the scent onto the ground surface, thereby leaving a scented trail to lure or attract animals, or mask the smell of a human.

When removed from the holder member 11, the bottle 30 containing the liquid scent may be hung in an inverted position by placing the hook 33 at its bottom end wall onto another article, such as a tree branch or hunting blind to lure or attract animals, or mask the smell of a human.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A scent dispenser apparatus attachable to a boot for dispensing animal lure onto the ground during walking activities comprising;

a holder member and a dispensing bottle removably attached to said holder member;

said bottle having a generally cylindrical body defining a reservoir for containing a liquid scent formulated to attract an animal, mask the smell of a human, or that will both attract an animal and mask the smell of a human, a removable cap attached to said bottle having a sponge on an end wall in fluid communication with said reservoir;

said holder member configured to be retained on the back side of a hunter's boot, having a base plate that is capable of engaging a bottom of a heel of the boot and a pair of arcuate curved arms disposed at each side thereof, an elastic cord secured at one end to one of said curved arms sized to be stretched over a vamp portion of the boot, and its free end configured to be releasably engaged on the other one of said curved arms; and said holder member having a back side configured to removably receive and retain said bottle in a vertical inverted position with said sponge extending downward and a distance below the bottom of the boot heel when said base plate is engaged on the bottom of the heel of the boot to engage the ground; wherein said sponge becomes saturated with said liquid scent when said bottle is inverted, and each time the boot wearer takes a step, said sponge becomes compressed to deposit an amount of said scent onto the ground surface, to leave a scented trail to attract animals and/or mask the smell of a human.

2. The scent dispenser apparatus according to claim 1, wherein
said bottle has an externally threaded reduced diameter neck portion, and said removable cap has internal threads engageable on said threaded reduced diameter neck portion, said removable cap being of a smaller diameter than the diameter of said body of said bottle, and said sponge has a generally cylindrical configuration.

3. The scent dispenser apparatus according to claim 2, further comprising:
a hook member on a bottom end wall of said bottle for hanging said bottle in an inverted position from another object when removed from said holder member.

4. The scent dispenser apparatus according to claim 2, wherein
said holder member is molded of a rigid material and has an arcuate vertical wall extending upward from a back end of said base plate that is concavely curved about a vertical axis to accommodate the back side of the boot when said base plate is engaged on the bottom of the heel of the boot; and
said arcuate curved arms are disposed a short distance above said base plate and extend outwardly and forwardly from sides of said arcuate vertical wall in laterally opposed relation.

5. The scent dispenser apparatus according to claim 4, wherein
said holder member back side has a generally flat top plate extending outwardly and rearwardly from a top end of said arcuate vertical wall to engage and support said bottle in said inverted position;
a generally flat upper support plate and lower support plate extending outwardly and rearwardly from a lower end of said arcuate vertical wall in parallel vertically spaced relation, each configured receive and support a downward facing end of said bottle and said cap such that said sponge extends downward from said lower support plate to engage the ground.

6. The scent dispenser apparatus according to claim 5, further comprising:
a pair of intermediate bottle support members disposed a distance below said top plate extending outwardly and rearwardly from said back side of said arcuate vertical wall in parallel vertically spaced relation, each configured to receive and support said cylindrical body portion of said bottle.

7. The scent dispenser apparatus according to claim 6, further comprising:
an elastic ring disposed between said intermediate bottle support members attached to said arcuate vertical wall to extend outwardly and rearwardly from said back side of said arcuate vertical wall to receive and partially encircle said cylindrical body portion of said bottle and resiliently hold said bottle firmly against said intermediate bottle support members.

* * * * *